Jan. 31, 1956

R. L. ALSMEYER 2,733,338

ELECTRONIC PROTECTIVE CIRCUITS

Filed Nov. 6, 1953

INVENTOR
RALPH L. ALSMEYER
BY Elmer J. Gorn
ATTORNEY

United States Patent Office 2,733,338

Patented Jan. 31, 1956

2,733,338

ELECTRONIC PROTECTIVE CIRCUITS

Ralph L. Alsmeyer, West Newton, Mass., assignor to Raytheon Manufacturing Company, Waltham, Mass., a corporation of Delaware Application November 6, 1953, Serial No. 390,651

6 Claims. (Cl. 250—27)

Figure 1:
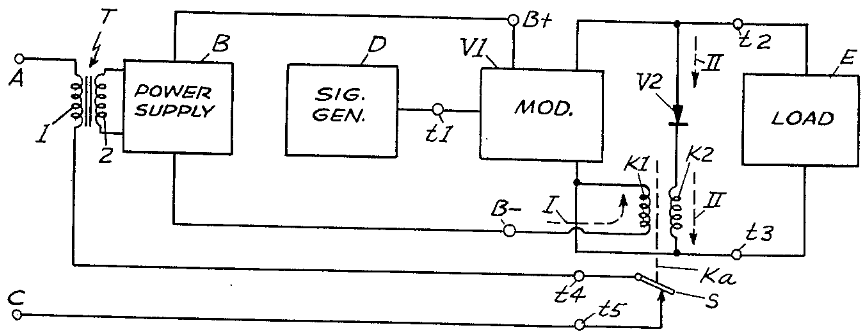

The present invention relates to electronic modulator circuits and particularly to modulator stages of electronic transmitters such as, for example, are used in radar or sonar pulse echo systems.

Generally such systems involve a power oscillator which is controlled by a modulator or switching valve so as to transmit oscillatory energy in periodic bursts or pulses, the switching valve momentarily conducting at periodic intervals determined by its associated circuits so as to release a previously accumulated high voltage charge through output or load terminals coupled to the oscillator. If the accumulated charge is not dispersed through the load circuit during each conducting interval of the switching valve, a reverse residual charge, opposite in polarity to the aforesaid accumulated charge, will remain and prevent proper operation of the modulator circuit. Therefore, a diode or like unidirectional conducting element is connected in parallel with the switching valve so as to dissipate the residual charge by shunting to ground what may be termed residual current.

While the typical circuit described above functions satisfactorily while each of its components is operating normally, damage may occur to the switching tube and its associated circuits if certain failures occur. For instance if the load circuit becomes shorted the reverse charge will nearly equal the accumulated charge and cause the shunting diode to conduct excessively high current. Conversely if the load circuit opens preventing discharge through the load excessive charges will be built up overloading the modulator circuit. Other circuit failures may result in continuous conduction of the switching tube, and consequent damage thereto.

One object of the present invention is to provide overload and underload protection for the modulator circuit of the above-described and similar types. Another object is to shut down the modulator in the event that it or its associated components are functioning improperly, and thereby give an indication of faulty operation.

In a broad aspect the protective circuit comprises valve means such as a modulator stage including power terminals and output terminals, a first coil connected in series with the power terminals, a unidirectional conducting element and a second coil connected in series with each other and in parallel with the aforesaid valve means, said circuit providing one current path through the power terminals and the first coil and another path through the unidirectional element and the second coil, the coils being arranged so as to induce substantially balanced magnetic fields when normal current flows through both of the aforesaid paths, and switch means actuated by unbalancing of the fields to render the valve means inoperative when current in one of the paths deviates from normal. Preferably the circuit includes means for balancing the magnetic fields; for example, variable means such as a potentiometer is connected to one of the coils to permit adjustment of the current therethrough.

More specifically the valve means comprises a normally non-conducting modulator including a charging network connected to the aforesaid output terminals so as to provide a charging current path through the power terminals and first coil, a primary discharge path through the modulator valve means when a trigger signal is applied through the signal input means to cause the valve means to conduct momentarily, and a secondary path for discharging residual current through the unidirectional element and second coil when the valve means ceases conducting, the coils being connected in the charging current path and the secondary discharging path, respectively, and the aforesaid switch means being actuated by unbalancing of the fields when current in the charging path or secondary path for discharging residual current deviates from normal.

Figure 2:
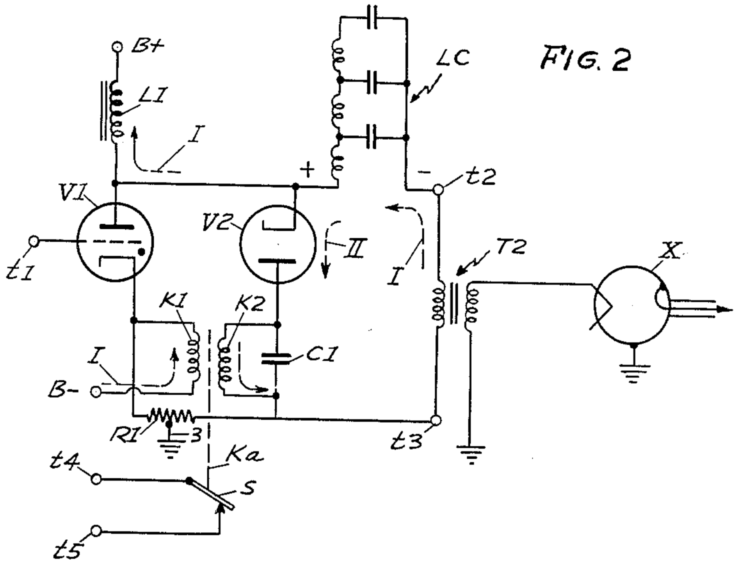

For the purpose of illustration a typical embodiment of the invention is shown in the accompanying drawings in which:

Fig. 1 is a block diagram of electronic apparatus incorporating the present protective circuit; and Fig. 2 is a schematic diagram of an overload and underload protected modulator circuit.

Shown diagrammatically in Fig. 1 is a modulator system including a modulator stage V1, its power supply B, a signal generator D and a load circuit E. Alternating current supplied at the terminals A and C is applied through the primary winding 1 and secondary winding 2 of a power transformer T. In a conventional manner the power supply B supplies rectified high voltage to the modulator power terminals B+ and B−. The signal generator D periodically applies a positive trigger pulse to the modulator input terminal *t1*. In response to the trigger pulse the modulator delivers a high voltage pulse at its output terminals *t2* and *t3*, the characterteristic of the pulse being determined by internal pulse forming components of the modulator stage V1. The high voltage modulator pulse is applied to the load E. Prior to triggering of the modulator V1 a charge is accumulated by current flowing along a path I from the negative power terminal B− through a solenoid coil K1, the load E and the modulator stage V1 to the positive power terminal B+. When the modulator is triggered this charge is largely transferred to the load E. For various reasons the charge may not be fully dissipated and a residual charge may remain after the modulator has applied the pulse to the load. The residual charge is removed through a residual current path II including a diode V2 and a second solenoid coil K2 connected in series with each other and in parallel with the modulator V1. The solenoid coils K1 and K2 are closely coupled and produce a composite magnetic field in which is disposed a common armature K*a*. The armataure K*a* operates a normally closed switch S which is connected through control terminals *t4* and *t5* in the primary winding 1 of the power transformer T. Since the charging current along path I is much greater than the residual current discharging path II, the fields of coils K1 and K2 are balanced either by adjustment of their respective effects on the armature K*a* or by other means to be described hereinafter. In any case the magnetic fields of the two coils are opposite in effect and balanced so that they normally have no attractive effect on the armature K*a*. If, however, the charging current or the residual discharging current varies owing to defects arising in the modulator or load circuits, the magnetic fields of the coils will become unbalanced and exert an attractive force on the armature K*a* opening the switch S. The primary power transformer winding 1 is thereby opened, removing voltage from the modulator power terminals B+ and B−.

One type of modulator suitable for use with the present protective circuit comprises a thyratron switch tube V1 whose plate circuit is connected to a pulse forming network LC and a charging choke L1. The thyratron V1 drives a magnetron tube X through a pulse coupling transformer T2. During the non-conducting interval of the thyratron V1 the pulse forming network LC is charged along path I from the positive side (+) of the pulse forming network through the charging choke L1 to the power terminal B+, and from the negative terminal B− through the first solenoid coil K1, a potentiometer R1, output terminal $t3$, the primary winding of the coupling transformer T2, the output terminal $t2$ to the negative side (−) of the pulse forming network. When the thyratron V1 is fired by a trigger pulse at its grid input terminal $t1$, it permits the pulse forming network LC to discharge through the transformer T2. In a conventional manner the network LC discharges for a pulse interval predetermined by its delay characteristic. During the discharge interval a high voltage pulse is coupled through the transformer T2 to the magnetron X, causing it to oscillate for the predetermined interval. If the impedance of the coupling transformer T2 and magnetron X which comprise the load for the modulator circuit exactly equals the impedance of the modulator circuit including the pulse forming network LC, then the charge on the pulse forming network is completely transferred to the load. In practice such close matching is not achieved and a residual charge remains on the pulse forming network. This charge is reverse in polarity to the original charge on the network and drives the cathode of the diode V2 negative with respect to its plate, causing the diode to conduct residual current until the residual charge is removed. The residual current passing through the diode and the second solenoid coil K2 tends to pulsate; however, a storage capacitor C1 inhibits pulsating current through the coil K2 and maintains a steady flow of current therethrough.

The poteniometer R1 is connected between the low voltage ends of the coils K1 and has a center tap 3 connected to ground. While the modulator and magnetron circuit are operating normally the potentiometer is adjusted so as to balance the charging current I and the residual current II and thus cause the magnetic fields induced by these currents to cancel each other and allow the switch S to remain closed so long as the circuits are operating normally.

Abnormal operation of the various circuits will cause the modulator to shut down in one of several ways. If the output of the modulator is shorted, as by short circuiting of the output terminals $t2$ and $t3$ or the primary winding of the coupling transformer T2, no load will be presented to the pulse forming network LC and its reverse charge will be almost equal to its forward charge. Consequently the residual current through the diode will increase to an excessive amount, thereby increasing the magnetic field of the second coil K2 and opening the control switch S so as to remove power from the modulator and render it inoperative. Excessive arcing of the magnetron is equivalent to an intermittent short in the modulator output.

If the output of the modulator should become open circuited no reverse charge will develop on the pulse forming network and the residual current will drop to zero as will the magnetic field induced by the second coil K2, again unbalancing the magnetic fields and opening the control switch S. If the thyratron V1 for any reason goes into constant conduction the pulse forming network will be unable to discharge and hence will develop no reverse charge so that the residual current will drop to zero. If an open circuit occurs in the diode the residual current through it, of course, will drop to zero.

Mode skipping of the magnetron will vary the mismatch with the pulse forming network and vary the residual current according to the nature of the mismatch.

The modulator is shut off in the event of any of the above failures and also if any of the protective circuit elements, such as the coils K1 and K2, the capacitor C1 and the potentiometer R1, become open or short circuited. Thus the present protective circuit not only prevents damage to the modulator but gives an indication if minor failures develop either in the modulator circuit proper or the components added for protecting the modulator. It should be understood, however, that I do not wish to limit the scope of my invention to any particular modulator circuit and that the present invention includes all modifications and equivalents which fall within the scope of the appended claims.

I claim:

1. In combination, a pulse forming network for storing electrical energy, a first coil forming with said network a charging circuit wherein the charging current flowing in said first coil will produce a magnetic field, a load circuit, a unidirectional switching means for discharging said network into said load circuit, a second coil connected in series with a unidirectional conducting device wherein said series combination is connected in shunt with said switching means for producing a conducting path in the opposite direction to that produced by said switching means, means for producing a substantially steady current in said second coil, said second coil adapted to be connected to produce a field substantially equal and opposite to the field produced by said first coil when a predetermined current flows therein, and means responsive to the relative field strength produced by said first and second coils for rendering inoperative the charging operation of said network.

2. In combination, a pulse forming network for storing electrical energy, a first coil forming with said network a charging circuit wherein the charging current flowing in said first coil will produce a magnetic field, a load circuit, a unidirectional switching means for discharging said network into said load circuit, a second coil connected in series with a unidirectional conducting device wherein said series combination is connected in shunt with said switching means for producing a conducting path in the opposite direction to that produced by said switching means, means for producing a substantially steady current in said second coil, said second coil adapted to be connected to produce a field substantially equal and opposite to the field produced by said first coil when a predetermined current flows therein, means responsive to the relative field strength produced by said first and second coils for rendering inoperative the charging operation of said network, and means for balancing said magnetic fields when normal currents flow through both the first and second coils.

3. In combination, a pulse forming network for storing electrical energy, a first coil forming with said network a charging circuit wherein the charging current flowing in said first coil will produce a magnetic field, a load circuit, a unidirectional switching means for discharging said network into said load circuit, a second coil connected in series with a unidirectional conducting device wherein said series combination is connected in shunt with said switching means for producing a conducting path in the opposite direction to that produced by said switching means, means for producing a substantially steady current in said second coil, said second coil adapted to be connected to produce a field substantially equal and opposite to the field produced by said first coil when a predetermined current flows therein, means responsive to the relative field strength produced by said first and second coils for rendering inoperative the charging operation of said network, a potentiometer having end taps connected to said first and second coils, respectively, and a center tap of said potentiometer connected to adjust the current flow through said first coil in order to balance the magnetic fields produced by said first and second coils when normal currents are flowing therein.

4. In combination, a pulse forming network for storing electrical energy, a first coil forming with said network a charging circuit wherein the charging current flowing in said first coil will produce a magnetic field, a load circuit, a gas discharge tube preferably of the thyratron type consisting of an anode, a grid, and a cathode, means for ionizing the gas in said discharge tube by impressing a voltage on said grid of said tube for discharging said network into said load circuit, a second coil connected in series with a unidirectional conducting device wherein said series combination is connected in shunt with said gas discharge tube for producing a conducting path in the opposite direction to that produced by said gas discharge tube, means for producing a substantially steady current in said second coil, said second coil adapted to be connected to produce a field substantially equal and opposite to the field produced by said first coil when a predetermined current flows therein, and means responsive to the relative field strength produced by said first and second coils for rendering inoperative the charging operation of said network.

5. In combination, a pulse forming network for storing electrical energy, a first coil forming with said network a charging circuit wherein the charging current flowing in said first coil will produce a magnetic field, a load circuit, a unidirectional switching means for discharging said network into said load circuit, a second coil connected in series with a unidirectional conducting device wherein said series combination is connected in shunt with said switching means for producing a conducting path in the opposite direction to that produced by said switching means, a capacitor connected in parallel with said second coil for producing a substantially steady current in said second coil, said second coil adapted to be connected to produce a field substantially equal and opposite to the field produced by said first coil when a predetermined current flows therein, and means responsive to the relative field strength produced by said first and second coils for rendering inoperative the charging operation of said network.

6. In combination, a pulse forming network for storing electrical energy, a first coil forming with said network, a charging circuit wherein the charging current flowing in said first coil will produce a magnetic field, a load circuit, a gas discharge tube preferably of the thyratron type consisting of an anode, a grid, and a cathode, means for ionizing the gas in said discharge tube by impressing a voltage on said grid of said tube for discharging said network into said load circuit, a second coil connected in series with a unidirectional conducting device wherein said series combination is connected in shunt with said gas discharge tube for producing a conducting path in the opposite direction to that produced by said gas discharge tube, a capacitor connected in parallel with said second coil for producing a substantially steady current in said second coil, said second coil adapted to be connected to produce a field substantially equal and opposite to the field produced by said first coil when a predetermined current flows therein, means responsive to the relative field strength produced by said first and second coils for rendering inoperative the charging operation of said network, a potentiometer having end taps connected to said first and second coils, respectively, and a center tap of said potentiometer connected to adjust the current flow through said first coil in order to balance the magnetic fields produced by said first and second coils when normal currents are flowing therein.

References Cited in the file of this patent

UNITED STATES PATENTS

| | | |
|---|---|---|
| 1,816,913 | Schelleng | Aug. 4, 1931 |
| 2,469,977 | Morrison | May 10, 1949 |
| 2,659,008 | Floyd | Nov. 10, 1953 |
| 2,677,805 | Rehkopf | May 4, 1954 |